United States Patent
Tsao

(10) Patent No.: US 10,050,432 B2
(45) Date of Patent: Aug. 14, 2018

(54) APPARATUS WITH LOAD DUMP PROTECTION

(71) Applicant: ELITE SEMICONDUCTOR MEMORY TECHNOLOGY INC., Hsinchu (TW)

(72) Inventor: Szu-chun Tsao, Yilan (TW)

(73) Assignee: Elite Semiconductor Memory Technology Inc., Taiwan (CN)

( * ) Notice: Subject to any disclaimer, the term of this patent is extended or adjusted under 35 U.S.C. 154(b) by 269 days.

(21) Appl. No.: 15/176,399

(22) Filed: Jun. 8, 2016

(65) Prior Publication Data
US 2017/0358918 A1    Dec. 14, 2017

(51) Int. Cl.
| H02H 5/04 | (2006.01) |
| H02H 3/22 | (2006.01) |
| H02H 1/00 | (2006.01) |
| H02H 3/20 | (2006.01) |
| H02H 7/06 | (2006.01) |
| H02H 7/08 | (2006.01) |
| H02H 9/04 | (2006.01) |

(52) U.S. Cl.
CPC ............ *H02H 3/22* (2013.01); *H02H 1/0007* (2013.01); *H02H 3/20* (2013.01); *H02H 7/067* (2013.01); *H02H 7/0838* (2013.01); *H02H 9/04* (2013.01)

(58) Field of Classification Search
USPC .................... 361/23, 86–87, 91.1
See application file for complete search history.

(56) References Cited

U.S. PATENT DOCUMENTS

2004/0264086 A1*  12/2004  Lin .................... H02H 7/09
361/91.1
2005/0179463 A1*  8/2005  Kasuya .............. H03K 17/0822
326/83

* cited by examiner

*Primary Examiner* — Danny Nguyen
(74) *Attorney, Agent, or Firm* — Juan Carlos A. Marquez; Marquez IP Law Office, PLLC

(57) ABSTRACT

An apparatus with load dump protection incorporates first and second half-bridge circuits, first and second comparators, and first and second clamping circuits. The first comparator compares a supply voltage with a first set voltage and generates a first comparison signal while the supply voltage exceeds the first set voltage. The second comparator compares the supply voltage with a second set voltage and generates a second comparison signal while the supply voltage exceeds the second set voltage. The first clamping circuit divides the supply voltage and provides a divided voltage to the first half-bridge circuit in response to the second comparison signal. The second clamping circuit divides the supply voltage and provides a divided voltage to the second half-bridge circuit in response to the second comparison signal.

9 Claims, 3 Drawing Sheets

US 10,050,432 B2

APPARATUS WITH LOAD DUMP PROTECTION

BACKGROUND OF THE INVENTION

1. Field of the Invention

The present invention relates generally to an electronic apparatus, and more particularly to an electronic apparatus having a load dump protection circuit.

2. Description of the Related Art

In an automotive application, abnormal conditions, such as load dump situations, surge pulses or voltage transients, may occur on power supplies.

When a load dump occurs, a surge voltage higher than 100V is applied to an electronic apparatus. In order to protect against high voltage, a protection circuit is required to protect devices of the system from permanent damage during a load dump.

SUMMARY OF THE INVENTION

One aspect of the present invention is to provide an apparatus for driving a load between first and second output nodes. The apparatus comprises a first half-bridge circuit, a second half-bridge circuit, a first comparator, a second comparator, a first clamping circuit, and a second clamping circuit. The first half-bridge circuit comprises first and second transistors connected in series between a supply voltage and a reference voltage, with the first output node between the first and second transistors. The second half-bridge circuit comprises third and fourth transistors connected in series between the supply voltage and the reference voltage, with the second output node between the third and fourth transistors. The first comparator is configured to compare the supply voltage with a first set voltage and generate a first comparison signal while the supply voltage exceeds the first set voltage. The second comparator is configured to compare the supply voltage with a second set voltage and generate a second comparison signal while the supply voltage exceeds the second set voltage. The first clamping circuit is configured to divide the supply voltage and provide a first divided voltage at the first output node in response to the second comparison signal. The second clamping circuit is configured to divide the supply voltage and provide a second divided voltage at the second output node in response to the second comparison signal. The second set voltage is larger than the first set voltage. The first, second, third, and fourth transistors are turned off in response to the first comparison signal.

BRIEF DESCRIPTION OF THE DRAWINGS

The invention will be described according to the appended drawings in which.

DETAILED DESCRIPTION OF THE INVENTION

Figure 1:
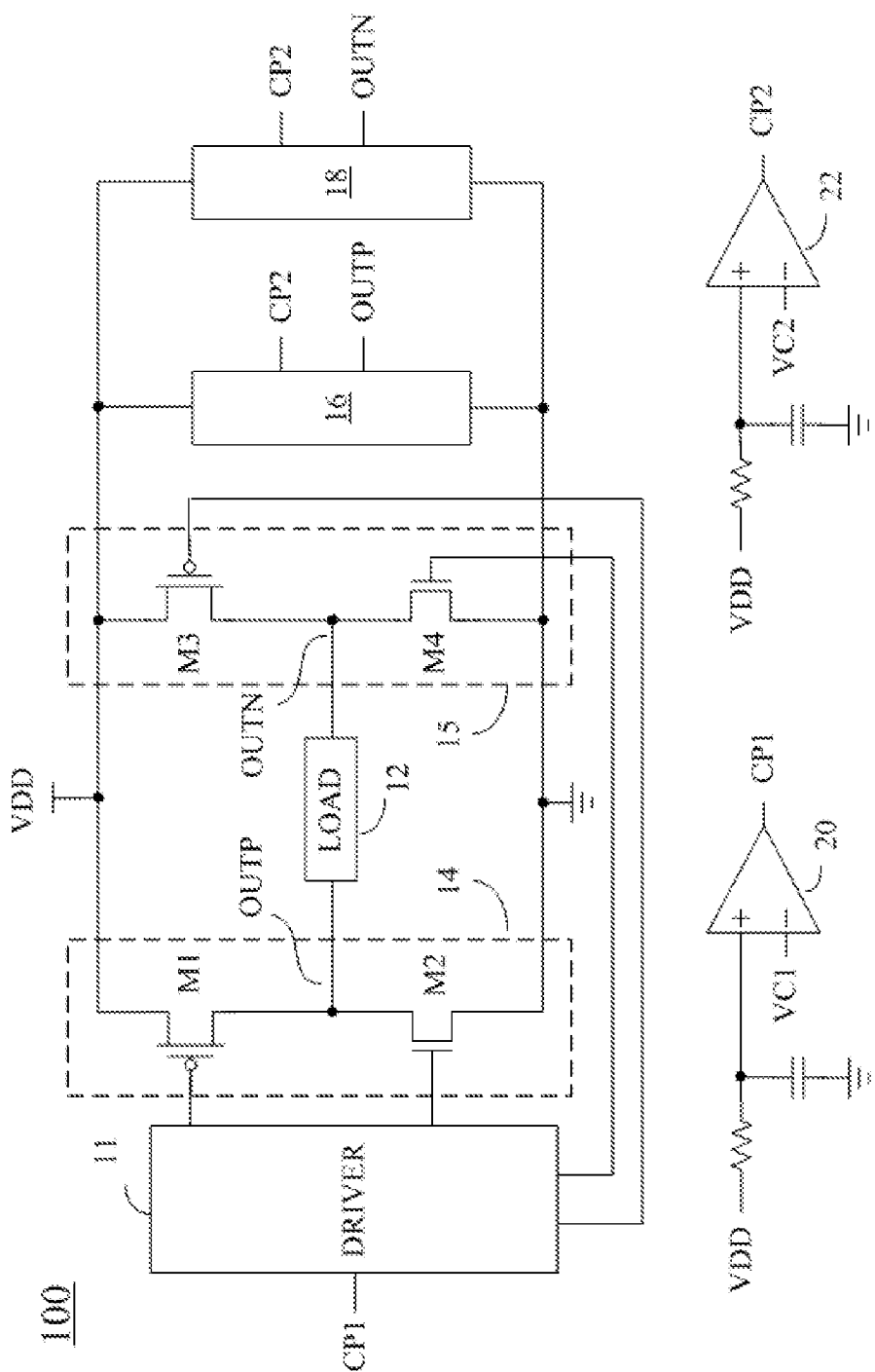
FIG. 1 shows a block diagram of an electronic apparatus according to one embodiment of the present invention.

FIG. 1 shows a block diagram of an electronic apparatus 100 according to one embodiment of the present invention. In this embodiment, the electronic apparatus 100 includes a class-D amplifier for driving a load 12. Class-D amplifiers are commonly used as speaker drivers in consumer, automotive and mobile applications. Referring to FIG. 1, the apparatus 100 comprises the class D amplifier with an H-bridge output stage. The H-bridge output stage consists of two complementary half-bridge output stages 14 and 15. One half-bridge output stage 14 has a high-side transistor M1 and a low-side transistor M2 connected in series between a supply potential VDD and a supply potential GND, and the other half-bridge output stage 15 has a high-side transistor M3 and a low-side transistor M4 connected in series between the power supply potential VDD and the supply potential GND. The half-bridge output stage 14 has a non-inverting output OUTP and the half-bridge output stage 15 has an inverting output OUTN.

The apparatus 100 further comprises two clamping circuits 16 and 18, wherein the clamping circuits 16 and 18 are connected between the power supply potential VDD and the supply potential GND. The clamping circuit 16 is used to divide the power supply potential VDD and provide a divided voltage at the output OUTP of the half-bridge output stage 14. The clamping circuit 18 is used to divide the power supply potential VDD and provide a divided voltage at the output OUTN of the half-bridge output stage 15.

The apparatus 100 further comprises two comparators 20 and 22. The comparator 20 is used to compare the power supply potential VDD with a set voltage VC1 to generate a comparison signal CP1. The comparator 22 is used to compare the power supply potential VDD with a set voltage VC2 to generate a comparison signal CP2. The comparison signal CP1 determines whether the transistors M1, M2, M3 and M4 of the H-bridge output stage are in OFF states, and the comparison signal CP2 determines whether the clamping circuits 16 and 18 are enabled.

Under normal conditions, that is, when the power supply potential VDD is not higher than a first predetermined voltage (e.g. 22V), current flows through the load 12 from left to right if the transistor M1 of the half-bridge output stages 14 and the transistor M4 of the half-bridge output stages 15 are turned on and the transistor M2 of the half-bridge output stages 14 and the transistor M3 of the half-bridge output stages 15 are turned off. Current flows through the load 12 from right to left if the transistor M2 of the half-bridge output stages 14 and the transistor M3 of the half-bridge output stages 15 are turned on and the transistor M1 of the half-bridge output stages 14 and the transistor M4 of the half-bridge output stages 15 are turned off.

When a load dump occurs, the power supply potential VDD rises above the first predetermined voltage for a short time. If the power supply potential VDD exceeds the first predetermined voltage, the comparator 20 generates the comparison signal CP1. The comparison signal CP1 transmits to a driver 11 to turn off the transistors M1, M2, M3 and M4 of the H-bridge output stage so as to protect the devices of the apparatus 100. Thereafter, if the power supply potential VDD rises above a second predetermined voltage higher than the first the predetermined voltage (e.g. VDD>28V), a protection mechanism for the transistors M1, M2, M3 and M4 in the OFF states is activated by enabling the clamping circuits 16 and 18.

Figure 2:
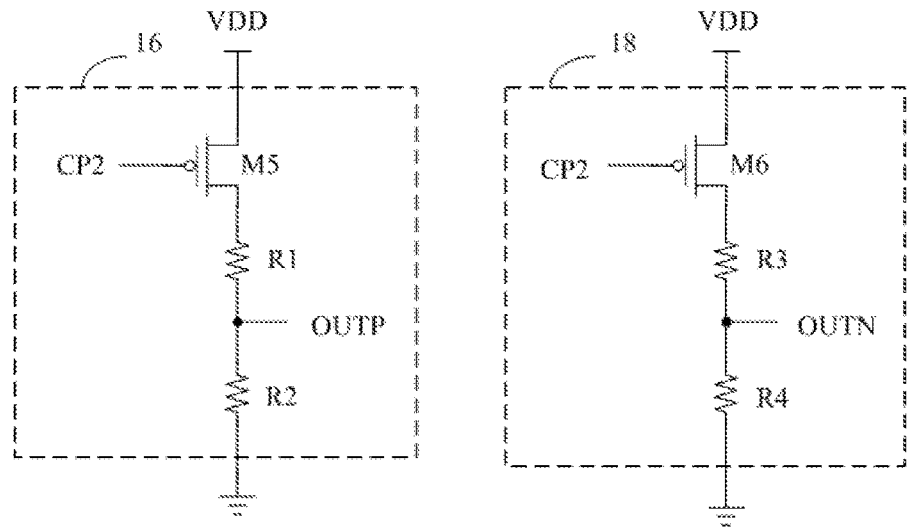
FIG. 2 illustrates a detailed circuit diagram of the clamping circuits shown in FIG. 1 according to one embodiment of the present invention.

When the power supply potential VDD rises above the second predetermined voltage, the comparator 22 generates the comparison signal CP2. The comparison signal CP2 transmits to the clamping circuit 16 to clamp the voltage at the output OUTP of the half-bridge output stage 14 and transmits to the clamping circuit 18 to clamp the voltage at the output OUTN of the half-bridge output stage 15. FIG. 2 illustrates a detailed circuit diagram of the clamping circuits 16 and 18 shown in FIG. 1 according to one embodiment of the present invention. Referring to FIG. 2, the clamping circuit 16 comprises a plurality of resistors R1 and R2 serially connected to the power supply potential VDD through a transistor M5, the clamping circuit 18 comprises a plurality of resistors R3 and R4 serially connected to the power supply potential VDD through a transistor M6.

The detailed operations of the clamping circuits 16 and 18 are described below with respect to FIG. 1 and FIG. 2. When the power supply potential VDD rises above the second predetermined voltage, the transistors M5 and M6 turn on. Since the ON-resistance value of the transistor M5 is significantly smaller than the total resistance values of the resistors R1 and R2, the clamping circuit 16 generates a divided voltage according to a resistance ratio of the resistors R1 and R2; and since the ON-resistance value of the transistor M6 is significantly smaller than the total resistance values of the resistors R3 and R4, the clamping circuit 18 generates a divided voltage according to a resistance ratio of the resistors R3 and R4.

Referring to FIG. 1 and FIG. 2, when the power supply potential VDD rises above the first predetermined voltage, the transistors M1, M2, M3 and M4 of the H-bridge output stage are turned off. However, if the power supply potential VDD continues to raise, such high voltage may cause the transistors M1, M2, M3 and M4 to experience drain-source voltages in excess of their rated drain-source breakdown voltage (BVdss). Therefore, the clamping circuits 16 and 18 are enabled to clamp the drain-source voltages of the transistors M1, M2, M3 and M4. Referring to FIG. 2, in one embodiment, the resistance ratio of the resistors R1 and R2 is set to be 1:1, and the resistance ratio of the resistors R3 and R4 is set to be 1:1. Therefore, the clamping circuit 16 generates a divided voltage by dividing the supply potential VDD at a ratio of 2, and the clamping circuit 18 generates a divided voltage by dividing the supply potential VDD at a ratio of 2.

Figure 3:
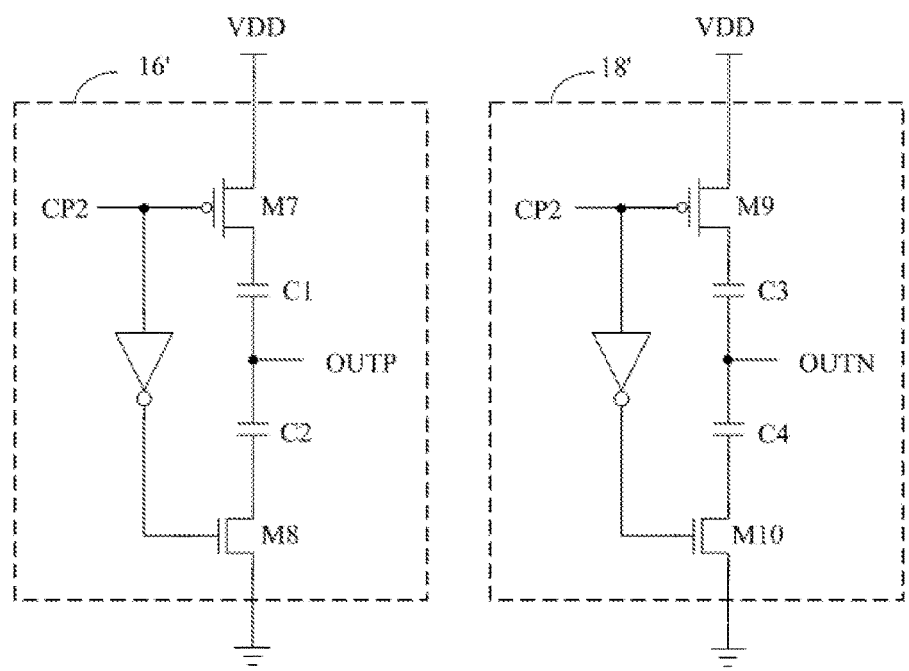
FIG. 3 illustrates a detailed circuit diagram of the clamping circuits shown in FIG. 1 according to another embodiment of the present invention.

The clamping circuits 16 and 18 shown in FIG. 2 are resistor dividers. However, it should be obvious that the present invention is not limited to this configuration. Referring to FIG. 3, the clamping circuits 16' and 18' can be capacitive dividers. When the transistors M7 to M10 turn on, the clamping circuit 16' generates a divided voltage at the output OUTP according to a capacitance ratio of the capacitors C1 and C2, and the clamping circuit 18' generates a divided voltage at the output OUTN according to a capacitance ratio of the capacitors C3 and C4. Therefore, the drain-source voltages of the transistors M1, M2, M3 and M4 are limited by the clamping circuits 16' and 18'. Furthermore, the drain-source voltages of the transistors M1 and M2 in the OFF states can be varied by adjusting the capacitance ratio of the capacitors C1 and C2, and the drain-source voltages of the transistors M3 and M4 in the OFF states can be varied by adjusting the capacitance ratio of the capacitors C3 and C4.

Figure 4:
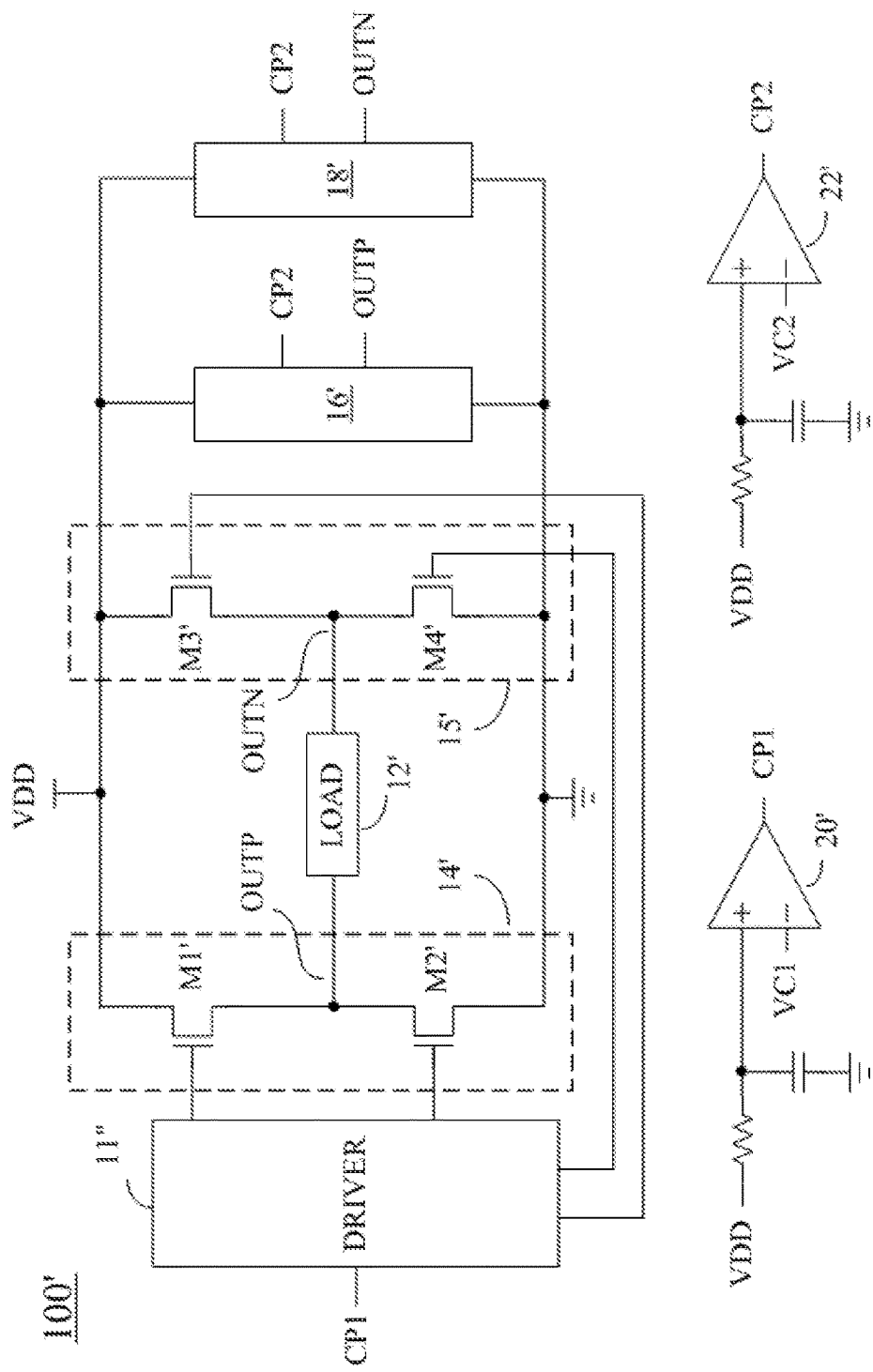
FIG. 4 shows a block diagram of the electronic apparatus according to another embodiment of the present invention.

Referring to FIG. 1, the transistors M1 and M3 of the H-bridge output stage are P-channel MOSFETs, and the transistors M2 and M4 of the H-bridge output stage are N-channel MOSFETs. However, it should be obvious that the present invention is not limited to this configuration. Referring to FIG. 4, the transistors M1', M2', M3', and M4' of the H-bridge output stage are all N-channel MOSFETs. In this embodiment, bootstrap capacitors (not show) are used to boost the voltage at the gate of the high-side transistor M1' of the half-bridge output stage 14' and boost the voltage at the gate of the high-side transistor M3' of the half-bridge output stage 15'. When a load dump occurs, if the power supply potential VDD rises above the first predetermined voltage, the transistors M1', M2', M3', and M4' of the H-bridge output stage are turned off first. If the power supply potential VDD continues to rise, the clamping circuits 16' and 18' are enabled to clamp the drain-source voltages of the transistors M1', M2', M3', and M4', so that the devices can be protected from damage.

The above-described embodiments of the present invention are intended to be illustrative only. Numerous alternative embodiments may be devised by those skilled in the art without departing from the spirit and scope of the invention as recited in the following claims.

What is claimed is:

1. An apparatus for driving a load between first and second output nodes, comprising:
    a first half-bridge circuit comprising first and second transistors connected in series between a supply voltage and a reference voltage, with the first output node between the first and second transistors;
    a second half-bridge circuit comprising third and fourth transistors connected in series between the supply voltage and the reference voltage, with the second output node between the third and fourth transistors;
    a first comparator configured to compare the supply voltage with a first set voltage and generate a first comparison signal while the supply voltage exceeds the first set voltage;
    a second comparator configured to compare the supply voltage with a second set voltage and generate a second comparison signal while the supply voltage exceeds the second set voltage;
    a first clamping circuit configured to divide the supply voltage and provide a first divided voltage at the first output node in response to the second comparison signal; and
    a second clamping circuit configured to divide the supply voltage and provide a second divided voltage at the second output node in response to the second comparison signal;
    wherein the second set voltage is larger than the first set voltage; and
    wherein the first, second, third, and fourth transistors are turned off in response to the first comparison signal.

2. The apparatus of claim 1, wherein the first transistor is a P-channel MOSFET, the second transistor is a N-channel MOSFET, the third transistor is a P-channel MOSFET, and the fourth transistor is a N-channel MOSFET.

3. The apparatus of claim 1, wherein the first transistor is a N-channel MOSFET, the second transistor is a N-channel MOSFET, the third transistor is a N-channel MOSFET, and the fourth transistor is a N-channel MOSFET.

4. The apparatus of claim 1, wherein the first clamping circuit comprises a plurality of resistors serially connected to the supply voltage through a fifth transistor, the fifth transistor is turned on in response to the second comparison signal.

5. The apparatus of claim 1, wherein the second clamping circuit comprises a plurality of resistors serially connected to the supply voltage through a sixth transistor, the sixth transistor is turned on in response to the second comparison signal.

6. The apparatus of claim 1, wherein the first clamping circuit comprises a plurality of capacitors serially connected to the supply voltage through a seventh transistor, the seventh transistor is turned on in response to the second comparison signal.

7. The apparatus of claim 1, wherein the second clamping circuit comprises a plurality of capacitors serially connected to the supply voltage through an eighth transistor, the eighth transistor is turned on in response to the second comparison signal.

8. The apparatus of claim 1, wherein the first clamping circuit provides the first divided voltage by dividing the supply voltage at a ratio of 2.

9. The apparatus of claim 1, wherein the second clamping circuit provides the second divided voltage by dividing the supply voltage at a ratio of 2.

* * * * *